Figure 5:
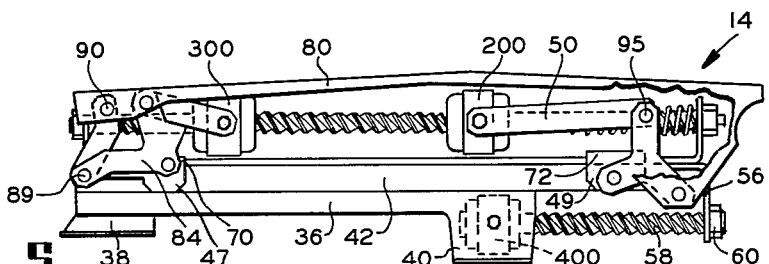

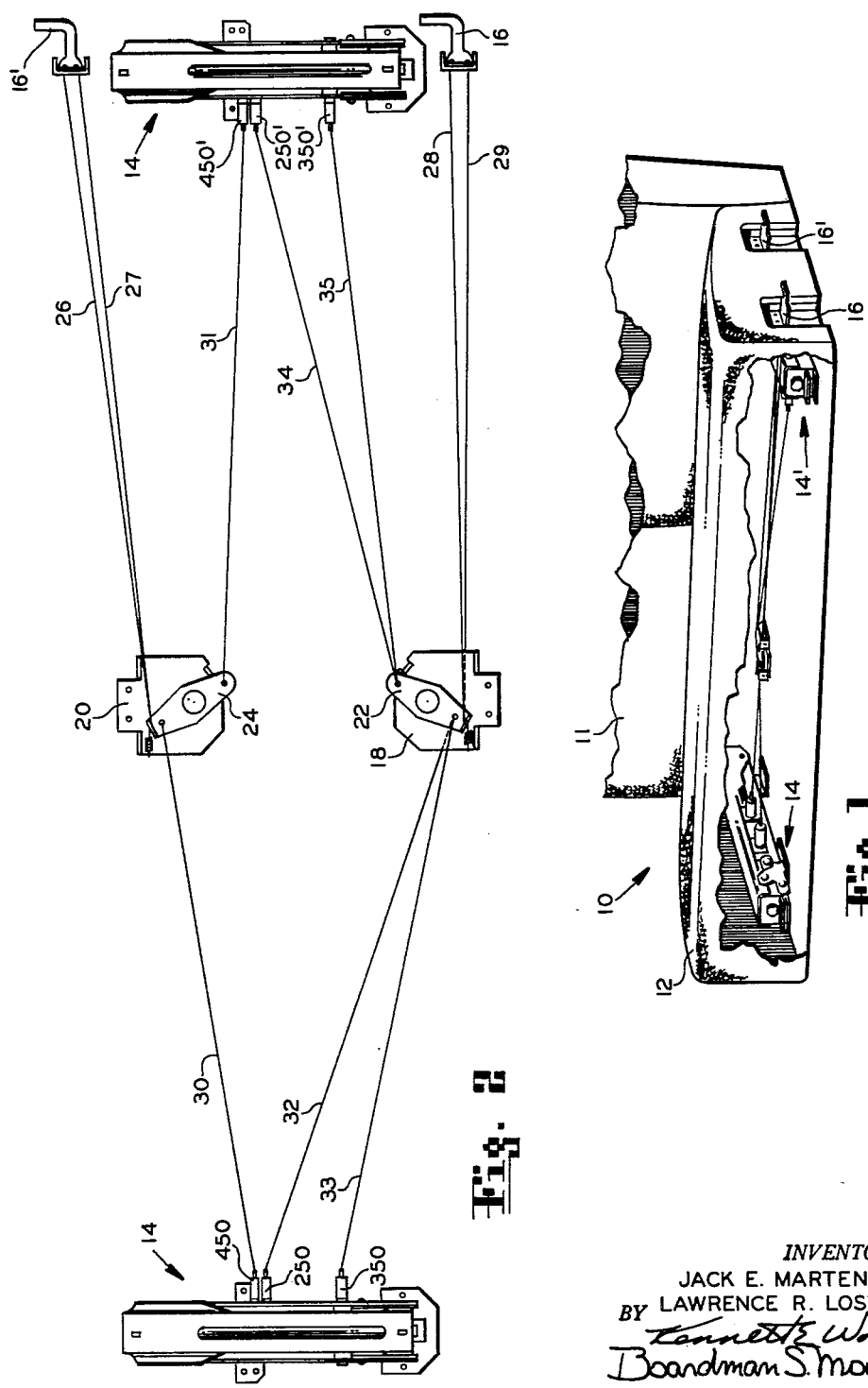

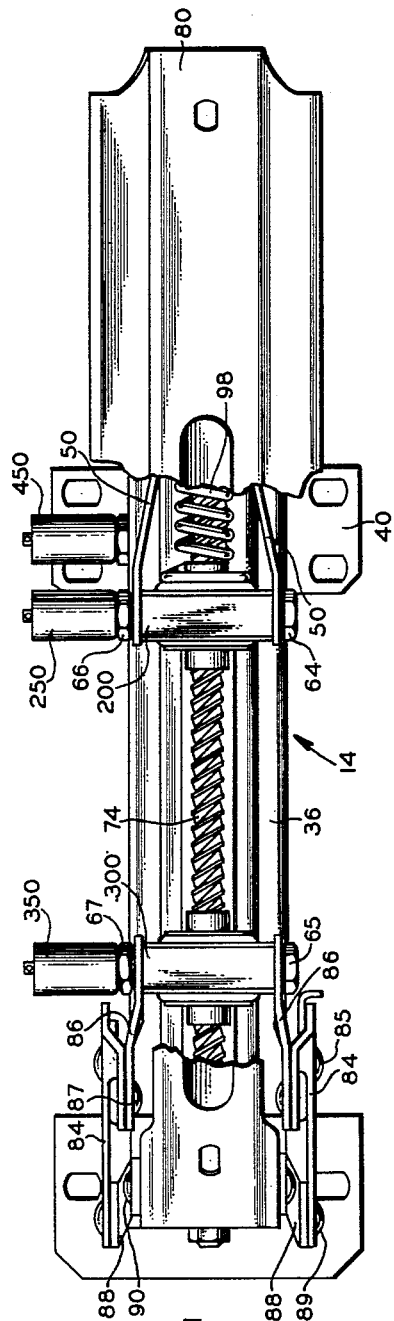
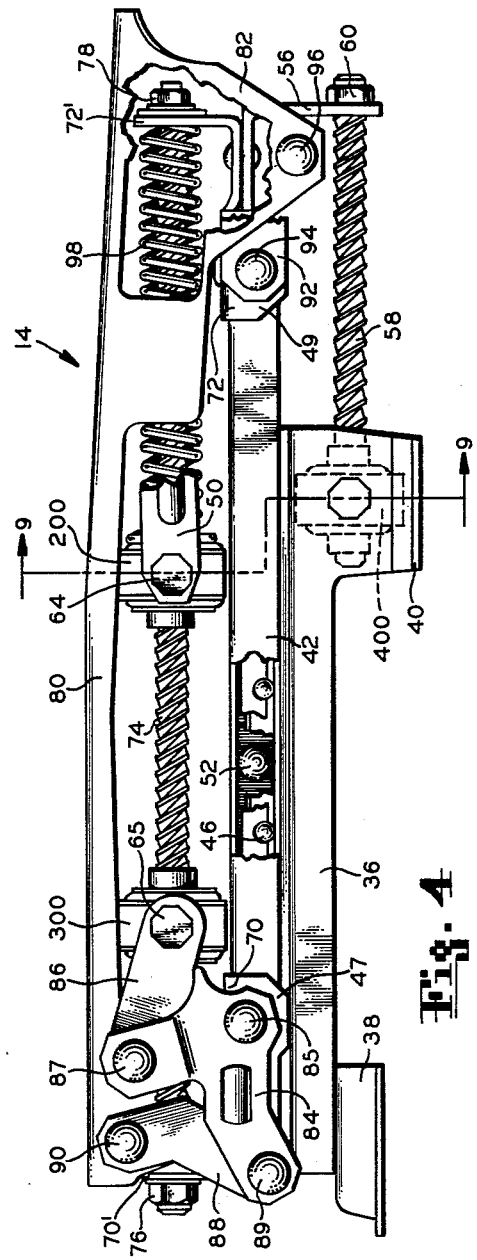

INVENTOR.
JACK E. MARTENS
LAWRENCE R. LOSKILL
BY
ATTORNEYS

INVENTOR.
JACK E. MARTENS
LAWRENCE R. LOSKILL
ATTORNEYS

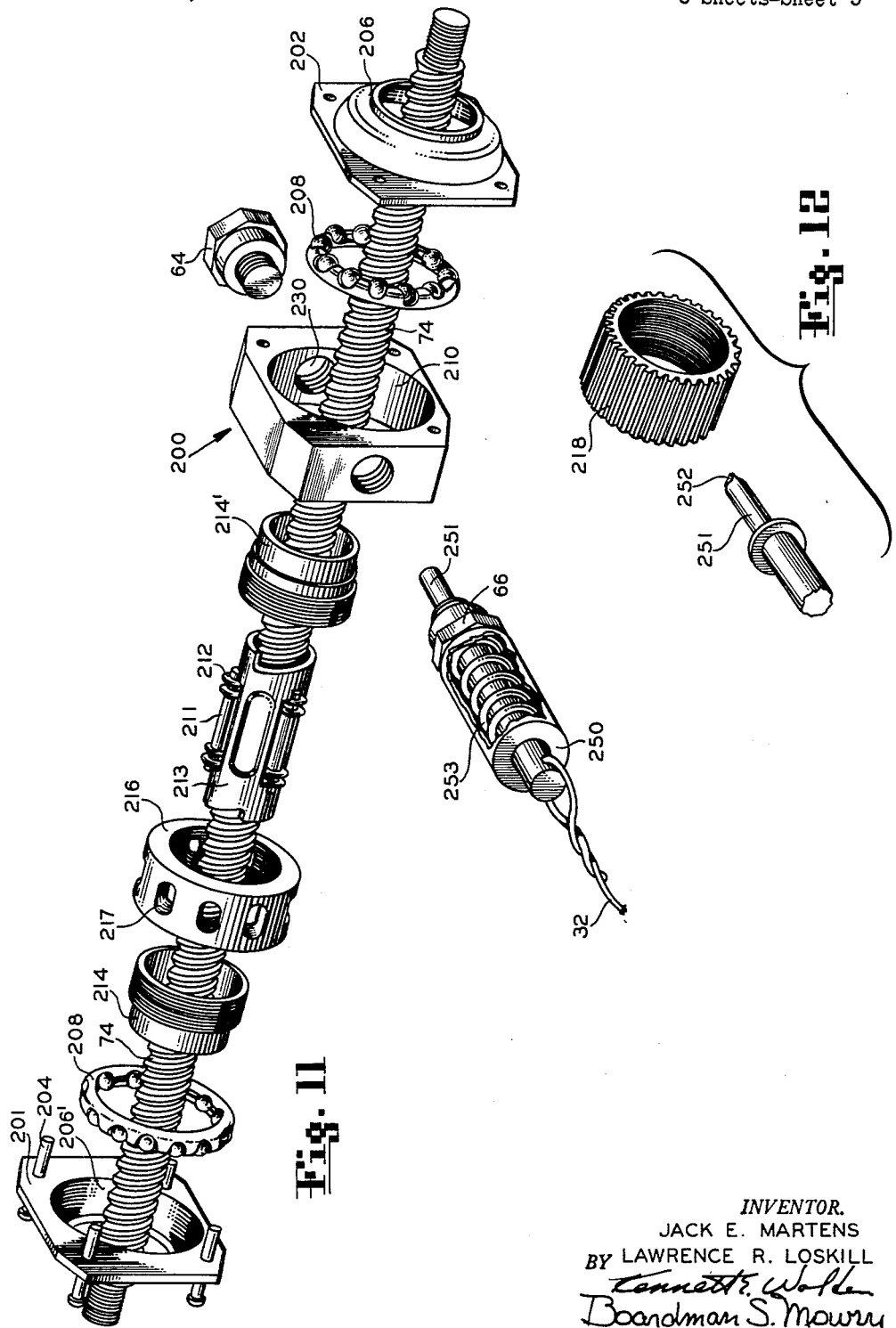

Oct. 27, 1964   J. E. MARTENS ETAL   3,154,284
SEAT POSITIONING DEVICE

Filed Jan. 25, 1962   6 Sheets-Sheet 6

INVENTOR.
JACK E. MARTENS
BY LAWRENCE R. LOSKILL
*Kenneth Walker*
*Boardman S. Mowry*
ATTORNEYS

United States Patent Office 3,154,284
Patented Oct. 27, 1964

3,154,284
SEAT POSITIONING DEVICE
Jack E. Martens, Gary, and Lawrence R. Loskill, Hammond, Ind., assignors to The Anderson Company, a corporation of Indiana
Filed Jan. 25, 1962, Ser. No. 168,735
11 Claims. (Cl. 248—371)

This invention relates to a vehicle seat adjustor and is particularly concerned with providing mechanism for supporting and maintaining a seat in an infinite number of relative positions.

It is old in the art to provide a seat adjustor having single or plural power means for adjusting a seat to various positions. Adjustors of this type are disclosed in U.S. Patents Nos. 2,915,111; 2,929,438 and 2,929,439. Also Patents Nos. 2,844,969 and 2,857,776 disclose subassemblies of the type employed in this type seat adjustor. In these disclosed adjustors, power means rotatably drive a screw member which has threaded thereon a nut for relative linear movement therealong. The nut members are usually provided with a normally disengaged solenoid which may be energized whereby rotation of the screw means will impart linear movement to the nut. Whenever the solenoid is disengaged, rotation of the screw means therethrough will not impart relative linear movement to the nut, but allow the nut and screw to rotate in a fixed linear position.

It will be evident from a study of their disclosures that inasmuch as the solenoids are normally disengaged, vibrations of the screw member will tend to permit the nut to be moved linearly therealong inasmuch as the linkage supporting the seat will always exert a force thereon in one direction or the other. Therefore, it can be seen that after a period of time, a seat, once adjusted to a new position, will settle due to the movement of the nut along the screw and will have to be readjusted periodically to retain its original position.

Therefore, a primary object of this invention is to provide a mechanism overcoming the above-referred to difficulties.

Therefore, it is a primary object of this invention to provide a mechanism so constructed as to maintain a seat in any one of a plurality of desired positions after the seat has been manually shifted to the desired position.

A further object of this invention is to provide an improved seat adjustor having a six-way manual adjustment, requiring no power source other than shifting the weight of the human body.

A further object of this invention is to provide a seat adjustor employing a screw-and-nut arrangement whereby the nut can be independently and fixedly secured on the screw at any desired position for maintaining the seat in position.

Other objects and advantages of the invention will become apparent after the description hereinafter set forth is considered in conjunction with the drawings annexed hereto.

Figure 6:
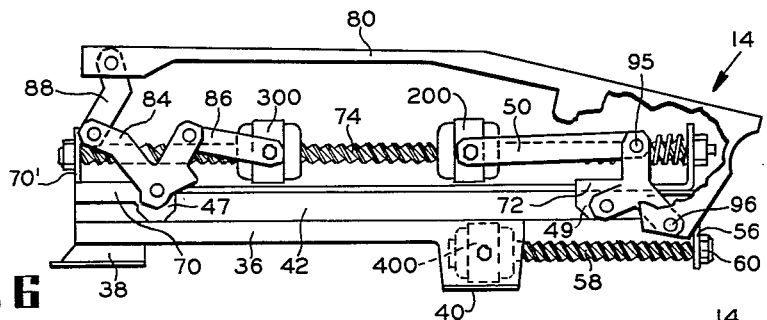
Figure 7:
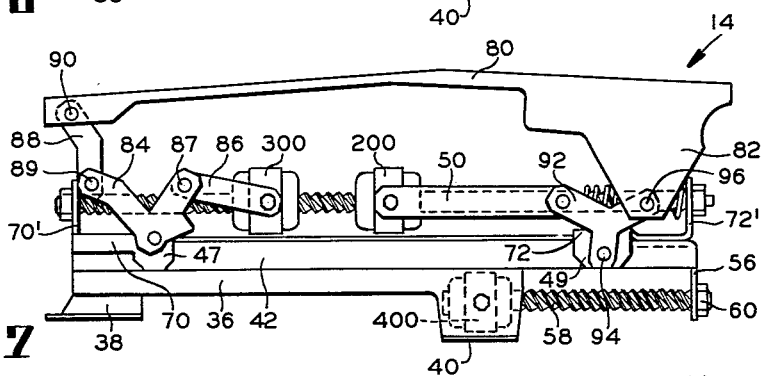
Figure 8:
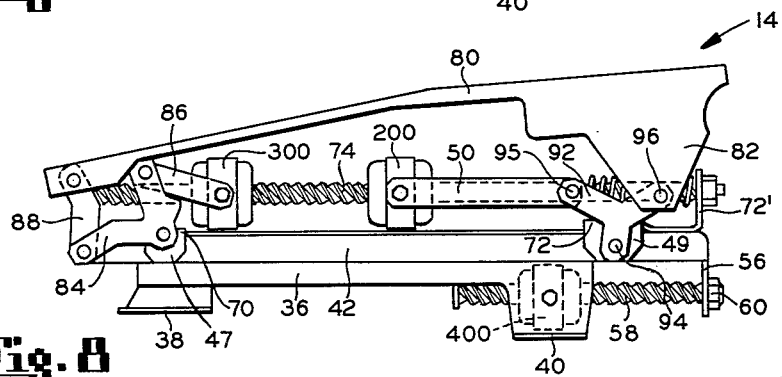
Figure 9:
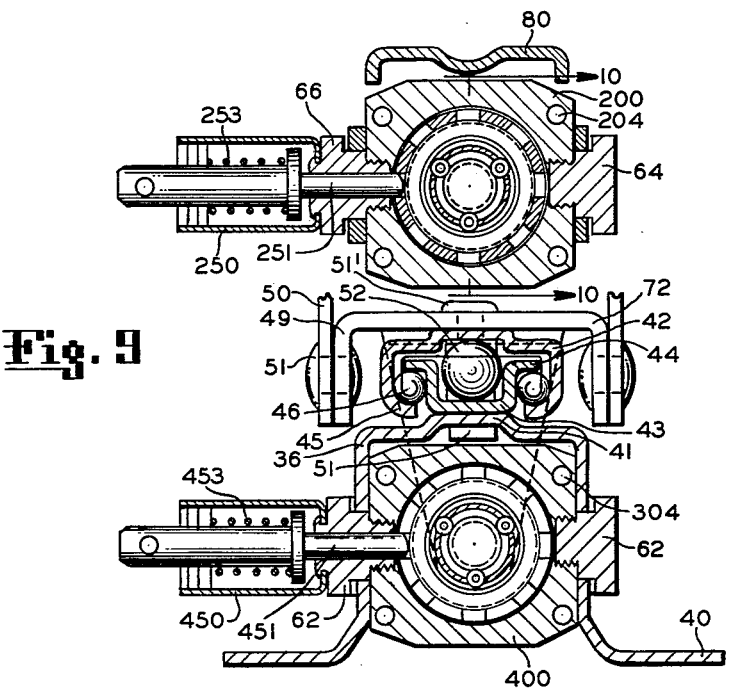
Figure 10:
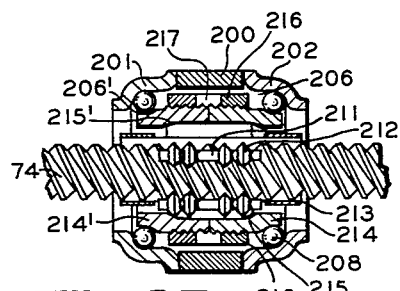
Figure 14:
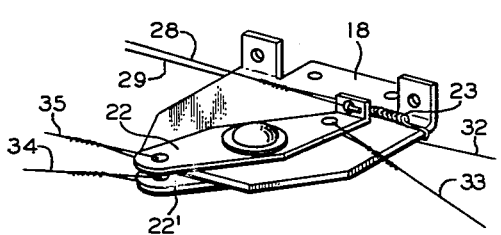
Figure 15:
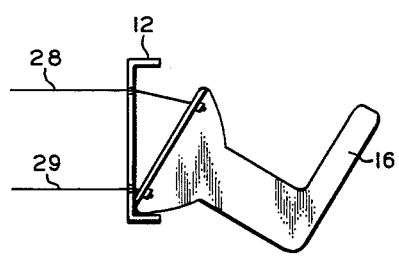
Figure 13:
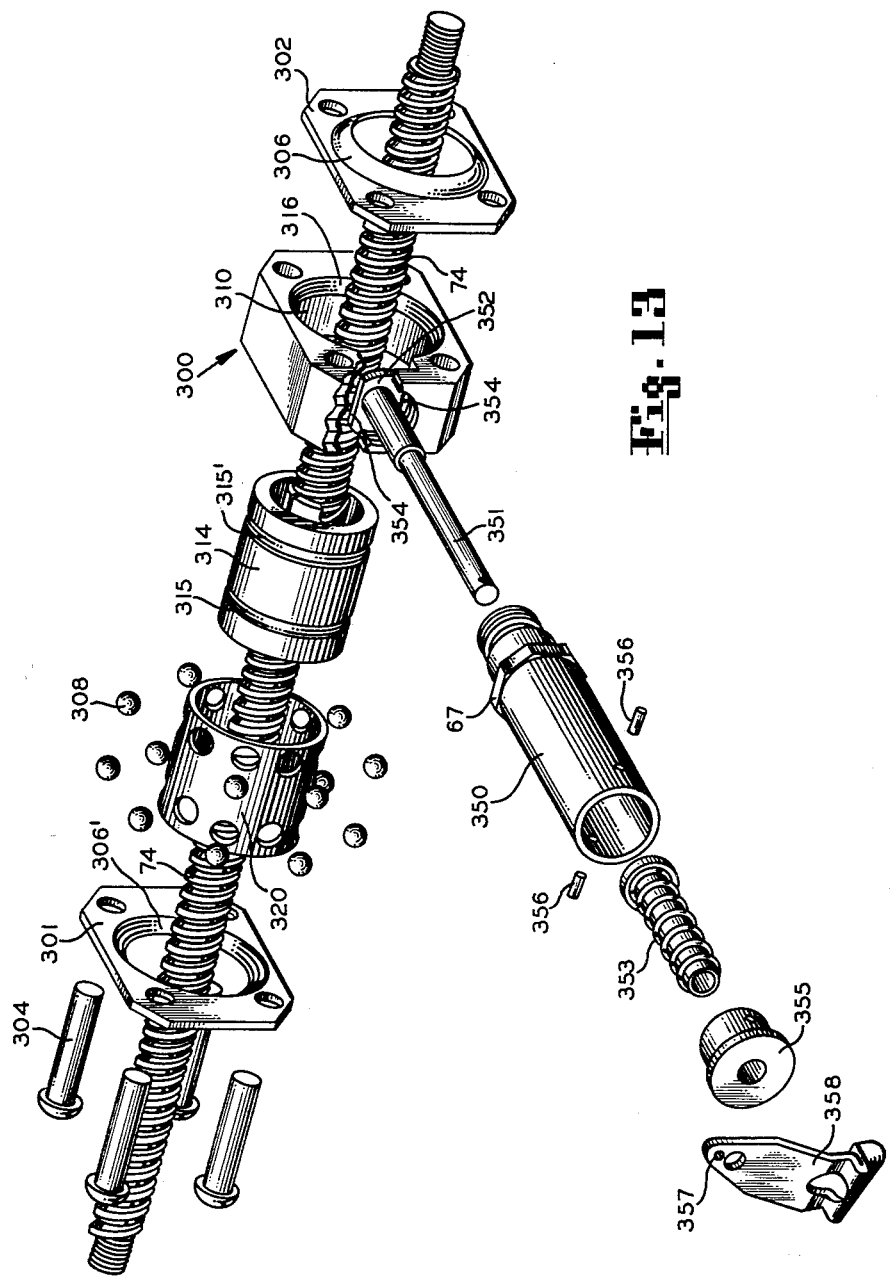

In the drawings:
FIGURE 1 is a cut-away perspective view of a seat employing our adjustor;
FIGURE 2 diagrammatically shows the relative position of the adjustors and the control means therefor;
FIGURE 3 is a plan view of an adjustor shown in partial section;
FIGURE 4 is a side view of the adjustor shown in partial section;
FIGURE 5 is a diagrammatic side elevation of the adjustor in one position;
FIGURE 6 is a view similar to FIGURE 5 showing the adjustor in a second position;
FIGURE 7 is a view similar to FIGURE 5 showing the adjustor in a third position;
FIGURE 8 is another view of the adjustor in a fourth position;
FIGURE 9 is a cross-sectional view taken along the line 9—9 of FIGURE 4;
FIGURE 10 is a cross-sectional view of the nut shown in FIGURE 9 and taken along line 10—10;
FIGURE 11 is an exploded view of a preferred form of the nut member;
FIGURE 12 discloses an alternate form of some of the elements of FIGURE 11;
FIGURE 13 is an exploded view of another form of the nut member;
FIGURE 14 shows a bracket member in detail;
FIGURE 15 shows a control handle in detail.

Like numerals throughout the various drawings designate similar parts. A seat for an automobile supported by our adjustors is shown in FIGURE 1 and designated generally by the numeral 10. It has a back portion 11 and a seat portion 12. The seat portion is cut away to show the relative position of the adjustors 14 and 14', one on each side thereof. Control handles 16 and 16' are mounted at one side of the seat, preferably at the driver's side, for manipulation by a seat occupant.

Noting FIGURES 2 and 14, it can be seen that manual pivotal movement of front handle 16, for instance, to the position as shown in FIGURE 15, will pull cable 28 to the right causing counterclockwise movement of top lever 22 against the action of spring 23. This pivotal movement of lever 22 pulls cables 33 and 35 releasing holding mechanism 350 and 350', respectively, of nuts 300 in each adjustor frame whereby nuts 300 are free for longitudinal movement along screw 74 thereby permitting movement of the front edge of the seat to a vertically raised or lowered position as shown in FIGURES 6 and 8, respectively. Release of handle 16 to a neutral position like that shown in FIGURE 2 will permit holding pins 350, 350' to lock nuts 300 in position on screw shaft 74. Moving the handle 16 to the rear or in a direction opposite to that shown in FIGURE 15 will release tension on cable 28 and pull cable 29 which is connected to bottom lever 22' (see FIGURE 14) causing counterclockwise movement thereof to pull cables 32 and 34. It can be seen that cables 32 and 34 are operatively connected to release means 250, 250' for releasing nuts 200 from a fixed position on helically threaded screw 74. When nuts 200 are released for movement along screw 74, the rear edge of the seat is free for pivotal movement to a vertically raised or lowered position such as shown in FIGURES 7 and 8. Release once again of handle 16 to a neutral position (FIGURE 2) permits nuts 200 to again become axially fixed or restrained with respect to screw 74 thereby fixedly supporting the seat in fixed position.

Rear handle 16', if manually pivoted to a forward position comparable to the position of handle 16 in FIGURE 15, pulls cable 26 for clockwise movement of lever 24. This, in turn, pulls cables 30 and 31 for manipulation of pins 450 and 450' to release nut 400. Once nut 400 is released for axial movement along lower helical screw 58, the seat can be manually adjusted to any desired forward or rearward position and so retained upon release of handle 16'. The relative forward and rearward positions are shown in FIGURES 7 and 8. Handle 16' is provided with another cable 27 permitting operation of cables 30 and 31 when pivoted in the other direction.

It can be seen that we have described the functions of our improved seat adjustor. We will now consider one of the adjustors, 14, for a more detailed description of its structure and operation. Since adjustor 14 has many parts symmetrical about the vertical, description will be made to only one element where the other is a mere duplicate thereof. This will achieve brevity in the specification, but, nevertheless, disclose the structure and geometry adequately to teach our invention.

Brackets 18 and 20 (FIGURE 2) are affixed to seat 12 substantially midway of the sides thereof. Bracket 18, as shown in detail in FIGURE 14, has a pair of independently operable levers 22, 22' pivoted thereon near their mid-point, one above bracket 18 and the other below. Bracket 20 contains only one similar lever 24 pivoted on the top thereof.

The adjustor per se is best disclosed in FIGURES 3 and 4. A base or frame 36 of formed metal, having downwardly extending leg portions 38 and 40 for attachment to the floor of an automotive vehicle, has a linear track disposed along the length of the back portion. This is more clearly shown in the cross-sectional view of FIGURE 9 wherein frame 36 contains a linearly raised portion 41 extending lengthwise along the top thereof. A lower track 43 is fixedly secured to portion 41 by rivets or other means 51 and contains spaced-apart spherical balls 52 in a trough therein. An upper track 42 is positioned above lower track 43 in rolling contact with balls 52 and has depending side portions inturned at the bottom 45 in cooperation with ears 44 to contain balls 46 distributed therebetween to prevent lateral and vertical play between the upper and lower tracks. Therefore, upper track 42, comprising part of the frame, is free for relative linear movement along track 43.

Plates 70, 72 extend transversely along portions of the upper track 42 at opposite ends thereof and are attached thereto by rivets or other means 51'. Plates 70, 72 have downwardly extending ears 47 and 49, respectively, to which bell cranks 84 and 92 are pivotally attached for supporting an upper frame 80. Upper frame 80 is supported by links 84 and 92 for pivotal, vertical and horizontal positioning of seat 10, which it supports. Frame 80 is of channel shape and substantially the same length as frames 36 and 42. An extension of the side flanges of the channel of frame 80 define ears 82 or the like to afford a connection for the aforementioned linkage 84 and 92. All frame members including linkage therefor may be made from stamped metal parts.

The rear portion of upper track 42 has a downwardly disposed strap portion 56 adapted to nonrotatably support a screw or threaded member 58 in a position substantially parallel with frame 36 and lower track 43. The purpose of this screw will be more fully described later in this specification. Upper track 42 additionally carries a pair of upwardly extending straps 70', 72' from opposite ends thereof for nonrotatably supporting another screw or threaded member 74 generally parallel with the track.

As most clearly shown in detail in FIGURES 3 and 4, or as shown more diagrammatically in FIGURES 5–8, nut members 200 and 300 are received on threaded screw 74, and nut member 400 is received on threaded shaft 58.

These nut members indicated by numerals 200, 300 and 400 are shown in exploded detail in FIGURES 11–13; however, at this time, it is sufficient to indicate that they are nonrotatably received on the threaded member in normally locked relationship wherein there can be no relative linear movement along the axis of the threaded member. Release means 250, 350 and 450 having pins 251, 351 and 451, respectively, form part of the nut members and are adapted to be operated to release the nut from the threaded member whereby it is free for linear movement therealong.

Starting with nut 400 locked on threaded member 58, it is readily apparent that the threaded member, upper track 42 and upper frame 80 are relatively fixed with respect to lower frame 36 and will remain in a locked fore-and-aft position relative to the floor of an automotive vehicle. Manipulation of rear handle 16' in either direction retracts pin 451 against the resilience of spring 453 thereby releasing nut member 400 with respect to threaded member 58 to permit the upper track and upper frame to be moved in any position in the fore-and-aft range. Release of handle 16' permits pin 451 to be seated by spring 453 to again restrain relative axial movement between nut 400 and threaded member 58 thereby holding the seat in fixed position.

In a similar manner, nut members 200 and 300 are releasably held in fixed position on threaded member 74. The release means 250 or 350, as previously described, is initiated by the manipulation of handle 16. Forward pivoting movement of handle 16 releases pin 350 of nut member 300 permitting relative axial movement of nut 300 along threaded member 74. The pivoting of handle 16 to the rear releases nut 200 for axial movement along member 74.

FIGURES 4–8 most clearly show the linkage means connecting upper frame 80 with upper track 42. It is readily apparent that one end of upper frame 80, corresponding to the front of the seat, may be raised or lowered by the seat occupant shifting his weight whenever nut 300 is released for axial movement along member 74. The linkage which is involved consists of a bell crank 84 pivotally supported from upper track 42 by pins 85 with additional links 86 and 88, respectively, connecting the legs of the bell crank to nut member 300 and upper frame 80. An additional bell crank 92 located at the other end of the adjustor is pivotally supported from the upper track by pivot 94. One leg of the bell crank 92 is pivotally connected to ear 82 of upper frame 80, while another leg is operatively connected by link 50 to nut 200. Release of the holding effect of nut 200 on screw 74 permits the rear of the seat to be positioned vertically to the position desired by the seat occupant, again shifting his body weight.

To aid in raising the rear portion of frame 80, corresponding to the rear of the seat as well, a spring member 98 is positioned around threaded member 74 bearing in compression between strap 72' and nut 200. Whenever pin 250 releases the holding effect of nut member 200, the nut is urged forward, and through link 50, rotating bell crank 92 counterclockwise (as viewed in FIGURES 5–8) to lift the rear of upper frame 80.

FIGURES 5–8 show the extreme relative positions to which the upper frame, which supports the seat, can be positioned. It can, of course, be positioned in any increment in between.

As previously indicated, and as shown in the plan view of FIGURE 3, identical bell cranks and links are located on opposite sides of the adjustor; only one side was described for purposes of clarity.

The members 58 and 74 have helical threads of appreciable axial lead—usually triple or quadruple threads. The nut members are operatively connected to these nuts in a manner described hereinbelow.

Nut members indicated by the numerals 200, 300 and 400 may be of either of the two forms shown in the exploded views of FIGURES 11 and 13. The cross-sectional view of FIGURE 9 is taken along the line 9—9 of FIGURE 4 and illustrates the type of nut shown in FIGURE 11. FIGURE 10 is a longitudinal cross section taken through nut 200. The forms disclosed in FIGURES 11 and 12 are preferred.

Nut member 200, functionally similar to nuts 300 and 400, is shown in the exploded view of FIGURE 11 for purposes of illustration. It consists of a main body having a cylindrical bore 210 receiving a threaded shaft 74 therethrough. A pair of bearing plates 201, 202 having end openings are secured to opposite ends of the body by rivets or other fastening means 204. Elongate rotatable bearing elements 211 having spaced-apart radially enlarged bearing surfaces 212 are peripherally spaced about screw 74 in load-bearing engagement with the helical threads thereof. Cage 213 has radially disposed elongate slots for receiving the elongate rotatable bearing elements 211 and positioning them radially about screw 74. A pair of identical bearing sleeves 214, 214' having annular raceways 215, 215' are threadably and securely received in opposite ends of rotatable ring member 216. Each sleeve 214, 214' has an external raceway. Radial and thrust bearings are positioned between raceways 206, 206' and the raceways of sleeves 214, 214' to thereby retain ring member 216 and bearing sleeves 214, 214' fixed to each other and rotatably positioned about the peripherally disposed radially enlarged bearing surfaces 212 in rolling contact therewith. The ring 216 and bearing sleeves 214, 214' are freely and rotatably mounted in ball bearings 208.

It can be visualized that if rotation were imparted to sleeves 214 and ring 216, that rotation would be imparted to the elongate bearing elements 211 causing them to planetate about screw 74. As they planetate, relative axial movement would ensue between screw 74 and nut 200. Screw 74 being nonrotatably mounted, and since the helical threads on screw 74 are relatively steep, an axial force applied to the nut would impart relative rotation to sleeves 214, 214' and ring member 216. Whenever the ring members and sleeves are restrained from relative rotation, the nut member 200 becomes fixed with respect to screw 74, both axially and rotatably.

Ring member 216 is provided with a plurality of radially extending slots 217 into which is selectively received a normally biased plunger 251. This plunger is carried by a release member 250 which in turn is threaded into the main body opening 230. Spring member 253 normally urges plunger 251 into one of these slots for restraining ring 216 from rotation to thereby fix nut 200 on screw 74. Plunger 251 is released from slots 217 by a pull on wire 32 originally exerted by handle 16.

An alternate form of ring 216 and plunger 251 is shown in FIGURE 12 wherein a gearlike surface 218 is provided on the outer periphery of the ring member, and the plunger 251 which is operable therewith has a chisel point 252 for mating with surface 218. The gearlike surface 218 performs the same function as slots 217.

It will be appreciated, as shown in FIGURES 9 and 10, that the nuts 200, 300 or 400 is essentially a holding device to control relative longitudinal or axial movement between the nut and screw 74. A pin or plunger 251, as shown in FIGURE 9, is received in slot 217 of ring 216. Thereby, ring 216 is restrained from rotation even though it is rotatably mounted in bearings 208. While the helical threads of screw 74 are relatively steep, the frictional engagement between the threads, enlarged bearing surfaces 212, and raceways 215, 215' is sufficient to prevent rotation of bearing elements 211 and their planetation about screw 74 thereby restraining relative axial movement between screw 74 and nut 200. Whenever pin 251 is withdrawn from slot 217, ring 216 is free for rotary movement in bearings 208 whereby a relatively low axial force between screw 74 and nut 200 will produce rotation and planetation of bearing elements 211 to permit relative axial movement between nut 200 and screw 74.

A further embodiment of a nut which may be employed in our device is shown in the exploded view of FIGURE 13, and is indicated by the numeral 300. The operation of this nut member is basically the same as that disclosed in FIGURE 11; however, its structure is somewhat different. A body having a bore 310 receives sleeve 314 therethrough with end plates 301 and 302 at opposite ends and secured thereto by pins 304 or other equivalent means. Surrounding sleeve 314 is a cage member 320 spacing ball bearings about sleeve 314 between raceways 315, 315' and outer raceway 316, formed in the ends of the main body and adjacent end plates 301 and 302.

The release mechanism 350 for nut 300 is similar to mechanism 250 in FIGURE 11. However, pin 351 has a head portion 352 having a pair of flat surfaces 354 on opposite sides thereof adapted to abut balls 308 to restrain their planetation and the rotation of cage 320. Like mechanism 250, release mechanism 350 is screwed into the body member and contains a compression spring 353 to normally bias plunger 351 toward and into contact with balls 308. A cap 355 is received in the end of release mechanism 350 and held therein by pins 356. A cable such as 33 can either be tied directly to plunger 351 as in FIGURE 11 or to an opening 357 in plate 358 which is pivoted and operates like a lever.

The mechanism within sleeve 314 consists of elongate rotatable bearing elements and a cage. They are substantially the same as members 211 and cage 213 of FIGURE 11.

Either nut, as shown in FIGURE 11 or 13, may be used with my device in any of the three positions. Relative axial force between the screw and nut will be resisted until the ring member 216 of FIGURE 11 or cage 320 of FIGURE 13 is freed for rotation by withdrawing the spring-urged plunger.

We described the operation of the handle, control cables and release mechanism of FIGURES 1 and 2. Then followed a detailed description of an actuator 14, as disclosed in FIGURES 3–8. Lastly, the nuts, as shown in FIGURES 11–13, have been fully described.

Having thus described our invention, it is obvious that various modifications may be made in the same without departing from the spirit of the invention; and, therefore, we do not wish to be understood as limiting ourselves to the exact forms, constructions, arrangements and combinations of parts herein shown and described.

We claim:

1. A seat adjustor of the type described comprising in combination:
    a first frame member and a second frame member interconnected by linkage at opposite ends thereof for independent relative vertical movement,
    a third frame member adapted to be secured to the floor of an automobile and provided with a substantially horizontal track for operatively receiving a track of the first member for relative linear movement therebetween,
    a first helically threaded screw of steep pitch nonrotatably carried by the first frame member,
    first and second nut means mounted on the first screw at spaced-apart locations for linear movement therealong independently of each other and each connected to the oppositely disposed linkage respectively,
    said nut means operatively engaging the relatively steep helical threads of the screw member,
    a second helically threaded screw having a steep pitch nonrotatably supported by the first frame member and received by a third nut means fixed on the third frame member whereby the second screw is adapted to reciprocate relative to the third nut means upon relative linear movement of the first and third frame members along the track means,
    biased locking means carried by each nut means normally restraining relative axial movement between the nut means and screw whereby the first, second and third frame members are fixedly held in a relative position,
    and release means permitting manual override of the normally biased locking means whereby the nut means may be moved axially along the screw whereby the frame members may be manually repositioned and there locked in another relative position.

2. The structure of claim 1 wherein the nut means has an annular ring member rotatably mounted therein in operative contact with the helical threads of the screw whereupon an axial force applied between the nut and screw will cause relative axial movement therebetween and the biased locking means cooperates with the ring to prevent relative rotational and axial movement between the nut and screw.

3. The structure of claim 2 wherein the locking means is a spring-urged plunger normally urging the plunger into a selected recess in the periphery of the ring member.

4. The structure of claim 2 wherein the manual override of the biased locking means permits the ring member to rotate with respect to the screw wherein an axial force applied to the nut will move the nut axially of the screw.

5. The structure of claim 2 wherein the nut means contains elongate rotatable bearing elements having spaced-apart radially enlarged bearing surfaces in operative contact between the helical threads and the inner periphery of the annular ring.

6. Structure of the kind described comprising an elongate support, an elongate member, a pair of longitudinally spaced adjustable means respectively supporting opposite extremities of said member whereby the member may be adjusted vertically relative to said support, a pair of releasable means for respectively normally automatically maintaining said adjustable means in locked positions, and means responsive to manual operation flexibly connected to said releasable means whereby the latter may be unlocked so that said adjustable means may be adjusted to raise or lower said member and then relocked.

7. Structure of the kind described comprising a pair of parallel elongate supports; a pair of elongate members and pairs of longitudinally spaced adjustable means respectively supporting opposite extremities of said members whereby the members may be adjusted vertically or tilted relative to said supports; releasable means for normally automatically maintaining said adjustable means in locked positions; a seat carried by and bridging said members; a movable device interposed between said supports and under said seat; a pair of flexible means respectively connecting said releasable means with said movable device; and manipulatable means whereby said device may be operated so the latter through the agency of said flexible means will unlock said releasable means so that said adjustable means may respond to body movements of an individual on said seat whereby the latter may be raised, lowered or tilted and then automatically locked in the position to which it has been adjusted by releasing said manipulatable means.

8. Structure of the kind described comprising a pair of parallel elongate supports; a pair of elongate members and pairs of longitudinally spaced adjustable means respectively supporting opposite extremities of said members whereby the members may be adjusted vertically or tilted relative to said supports; releasable means for normally automatically maintaining said adjustable means in locked positions; a seat carried by and bridging said members; a movable device interposed between said supports and under said seat; flexible means respectively connecting said releasable means with said movable device; manipulatable means disposed at a location remote from said movable device; and means connecting said movable device and said manipulatable means whereby said device may be operated to unlock said releasable means so that said adjustable means may be actuated to raise, lower or tilt said seat and then automatically locked in the position to which it has been adjusted by releasing said manipulatable means.

9. Structure of the kind described comprising a pair of parallel elongate tracks; a pair of elongate members longitudinally movable on said tracks; pairs of longitudinally spaced adjustable means movable respectively supporting opposite extremities of the member whereby the member may be adjusted vertically or tilted relative to said track; releasable means for normally automatically maintaining said adjustable means in any desired locked positions; a seat carried by and bridging said members; movable structure interposed between said tracks and under said seat; flexible means respectively connecting said releasable means with said movable structure; and manipulatable means whereby said movable structure may be operated so the latter through the agency of said flexible means will unlock said releasable means so that said adjustable means may be actuated so said seat may be raised, lowered or tilted and then automatically locked in the position to which it has been adjusted by releasing said manipulatable means.

10. Structure of the kind described comprising a pair of parallel tracks, a pair of elongate supports mounted on said tracks for longitudinal movement; a pair of elongate members; pairs of longitudinally spaced adjustable means respectively supporting opposite extremities of said members relative to said supports whereby the members may be adjusted vertically or tilted relative to said supports; pairs of releasable means for respectively normally automatically maintaining said pairs of adjustable means in locked positions; a seat carried by and bridging said members; a pair of separate movable devices interposed between said supports and under said seat; two pairs of flexible means respectively connecting said pairs of releasable means with one movable device; an additional pair of releasable means for respectively normally automatically maintaining said supports in locked positions on said tracks; a pair of flexible means respectively connecting said additional pair of releasable means with the other of said movable means, a first manipulatable means whereby said one device may be operated to unlock said pairs of releasable means so that said adjustable means will enable said seat to be raised, lowered or tilted and then automatically locked in the position to which it has been adjusted by releasing said manipulatable means; and a second manipulatable means whereby said other device may be operated to unlock said additional pair of releasable means to permit longitudinal movement of said supports to a desired position on said tracks and then automatically locked in such position by releasing this manipulatable means.

11. Structure of the kind described comprising a pair of parallel elongate tracks; a pair of elongate members slidable on said tracks; pairs of longitudinally spaced adjustable means respectively supporting opposite extremities of said members; releasable means for normally automatically maintaining said members in any desired locked positions in said tracks; a seat carried by and bridging said members; movable structure interposed between said tracks and under said seat; flexible means respectively connecting said releasable means with said movable structure; and manipulatable means whereby said movable structure may be operated so the latter through the agency of said flexible means will unlock said releasable means so said members, adjustable means and seat, as a unit, may be moved longitudinally relative to said tracks and then automatically locked in the position to which it has been adjusted by releasing said manipulatable means.

References Cited in the file of this patent
UNITED STATES PATENTS

| | | |
|---|---|---|
| 2,857,776 | Williams et al. | Oct. 28, 1958 |
| 2,860,521 | Sierant | Nov. 18, 1958 |
| 2,929,439 | Tanaka et al. | Mar. 22, 1960 |
| 2,979,965 | Diebold | Apr. 18, 1961 |